SUPERVISORY RELEASE SIGNAL PULSE DETECTOR

Filed Oct. 10, 1967 3 Sheets-Sheet 1

INVENTOR
G. C. FIELDS
BY Brendan P. Ward
ATTORNEY

SUPERVISORY RELEASE SIGNAL PULSE DETECTOR

Filed Oct. 10, 1967

Nov. 24, 1970 G. C. FIELDS 3,542,969

SUPERVISORY RELEASE SIGNAL PULSE DETECTOR

Filed Oct. 10, 1967 3 Sheets-Sheet 3

United States Patent Office 3,542,969
Patented Nov. 24, 1970

3,542,969
SUPERVISORY RELEASE SIGNAL PULSE DETECTOR

Gary C. Fields, Oakland, Calif., assignor to American Telephone and Telegraph Company, New York, N.Y., a corporation of New York Filed Oct. 10, 1967, Ser. No. 674,137
Int. Cl. H04m 5/04
U.S. Cl. 179—42 7 Claims

ABSTRACT OF THE DISCLOSURE

A supervisory signal detector circuit is arranged to recognize the termination of a switchboard trunk-to-trunk connection by detecting the pulse generated by the collapse of the magnetic fields through the relay windings and repeat coils of the connection upon a station on-hook condition at the end of the call.

A bridge circuit is provided at the input to the pulse detector to permit the detector to operate on a positive or negative going pulse, thus negating the effect of a line reversal which occurs on certain such connections. In addition, a low pass filter is serially inserted between the bridge circuit and the detector to render the detector insensitive to voice currents and high frequency noise.

BACKGROUND OF THE INVENTION

Field of the invention

This invention pertains to telephone switchboards and more particularly to circuit arrangements for detecting supervisory signals at such switchboards.

Description of the prior art

In modern telephone switching systems, various features have been provided which make it possible for a connection directed to a called station to be automatically extended to another station during the absence of the subscriber at the originally called station (see, for example Pat. No. 2,274,759, dated Mar. 3, 1942, issued to J. W. Wicks; see also U.S. Pat. No. 3,363,063, issued Jan. 9, 1968, to S. Kandel and C. C. Neilson). Such arrangements fulfill the need of the average telephone subscriber who is usually concerned with a relatively few incoming calls during his absence.

However, other subscribers, such as physicians, also require a similar arrangement but on a significantly higher scale than conventional subscribers in view of the relatively large number of calls involved in conjunction with the nature of such calls. In regard to this latter aspect, incoming calls to a physician, or similar telephone customer, may be classified in two broad categories; the first category comprising conventional, nonemergency calls and the second category comprising calls requiring immediate attention. In the first instance the nature of the call does not warrant completion of a connection through to the physician. On the other hand, the second type call dictates the need for immediate extension of the connection through to the physician in privacy and without impairment of the calling connection transmission. Obviously, first it must be determined in which category a given calling connection is to be classified.

The solution to the foregoing problem is thus not found in the automatic extension of each calling connection in the manner provided for conventional subscriber service. Rather, to fulfill this need in the art, telephone answering switchboards have been provided wherein incoming calls to various subscribers, such as physicians, are completed through to one or more operator positions during the subscriber's absence. The answering operator thereupon determines the appropriate action to be taken in view of the particular situation presented. Thus, the insertion of the human element in the person of the answering service operator permits the flexible and expeditious handling of calls of this nature.

Although the presence of the operator thereby provides the necessary decision-making function with respect to the extension of each call, the need for automation of all other functions remains as desirable and necessary as in any other switching system. This is particularly true when the significant expansion of telephone answering services is noted. Thus, in an attempt to reduce operator effort and thereby increase the efficiency of such installations, automatic answer and automatic dialing by mere key manipulation at such locations is presently well known in the art. However, a significant problem still prevails with respect to incoming calls which are extended from the operator position through to a remote called central office.

The particular problem presented is that, in order to extend the connection from such a switchboard, it is necessary to "patch" or extend the incoming trunk connection through some form of auxiliary supervisory circuit to an outgoing trunk to the called destination. The supervisory circuit is needed in order that the operator in attendance may recognize the cessation of the connection upon an on-hook condition of either party. Additionally, such circuits provide the amplification necessary in certain instances as determined by the location of the respective central offices.

The problem of the design and operation of an effective supervisory circuit is compounded when it is recognized that the interconnected central offices will vary in terms of their respective distances from the switchboard, in terms of the quality of trunk conductors, and in terms of the respective potentials and signaling techniques employed. Thus, a present-day supervisory circuit may be satisfactory with respect to a given connection and totally unsatisfactory for another. The over-all result is that the operator is quite often forced to monitor, although only momentarily, and existing connection in order to ascertain whether the particular supervisory signal manifested is, in fact, valid.

Thus, for example, in determining whether either station has been placed in an on-hook condition in terminating the calling connection prior art supervisory circuits generally detect the pulse generated by the opening of the calling or called station switchhook contacts. The specific problem thereby posed in such circuits is that a spurious pulse resulting from noise or interference is indistinguishable from a valid on-hook signal. The obvious result, of course, is the inability of the operator to depend upon such indications with resulting inefficiency, thereby magnifying the very problem which the circuit seeks to solve.

Accordingly, a need exists in the art for a supervisory circuit which is operable to provide a manifestation of the termination of a switchboard trunk-to-trunk connection with a degree of certitude such that an operator may act in reliance thereon. Additionally, a need exists for such a supervisory circuit to function irrespective of the potentials and signaling techniques employed by the respective interconnected offices. Also a need exists for a circuit arrangement which will accomplish the foregoing in an efficient and economical manner so as to render it available on a circuit for circuit basis with each outgoing trunk which may be required for the extension of such connections.

SUMMARY OF THE INVENTION

In the exemplary embodiment a supervisory circuit containing a circuit arrangement employing the principles of my invention is associated with each outgoing trunk from a switchboard arranged for telephone answering service. Thus, each time an outgoing trunk is selected for the purpose of extending a calling connection, the subject supervisory circuit is serially inserted between the outgoing trunk and the incoming trunk associated with the calling connection.

Within the supervisory circuit a switched gain amplifier circuit provides the necessary amplification. The communication conductors associated with the established connection are extended from the amplifier circuit to a pulse detector which detects the appearance of a pulse on the communication conductors when either station interrupts its communication path by going on-hook. The enabling of the pulse detector in turn causes the operation of a relay which flashes a supervisory lamp thereby informing the attendant that the connection has been terminated and thus that the equipment may be released.

I have discovered that this pulse generated upon either party going on-hook results from the sudden opening of that party's D-C loop which causes a damped electrical wave of from 200 to 325 Hz. to be generated because of a collapse of the magnetic fields in the inductive elements, such as repeat coils and relay windings, previously employed in the speech path of the connection. Accordingly, and in accordance with an aspect of my invention, the pulse generated upon completion of the connection is passed through a low pass filter within the pulse detector so as to render the pulse detector insensitive to voice currents and high freqency noises. In one specific illustrative embodiment the filter is designed to pass only those frequencies below 325 Hz. In this manner spurious signals will not falsely alert the operator to disconnect an established connection prematurely.

In accordance with another aspect of my invention, the pulse passing through the filter is transmitted to a diode bridge circuit. I provide the bridge circuit to permit the pulse detector to respond to a positive as well as a negative going pulse thereby rendering the detector effective independent of whether or not line reversal occurs as part of the supervisory switching signals between central offices.

The output of the bridge circuit is extended to the base of a transistor high gain driver stage thereby turning on the transistor and causing its collector to go positive. When the collector of the transistor exceeds a bias normally imposed upon the gate of an associated silicon control rectifier, the silicon control rectifier is enabled thereby operating an associated relay. The operation of this relay restores the pulse detector to normal and enables the supervisory lamps, as aforesaid, to thereby alert the attendant to the termination of the trunk-to-trunk connection.

In accordance with one feature of my invention, a supervisory circuit is provided with a pulse detector operable to respond to a pulse generated by the on-hook condition of a station associated with a communications channel to the exclusion of pulses generated by voice currents and high frequency noise.

In accordance with another feature of my invention, a bridge circuit is associated with a pulse detector arranged as immediately aforesaid so as to render the pulse detector functional independently of whether or not a reversal of potential has occurred on the associated communications channel.

DESCRIPTION OF THE DRAWING

The aforegoing objects, features and advantages, as well as others, of the invention will be more apparent from the following description of the drawing, in which.

Figure 2:
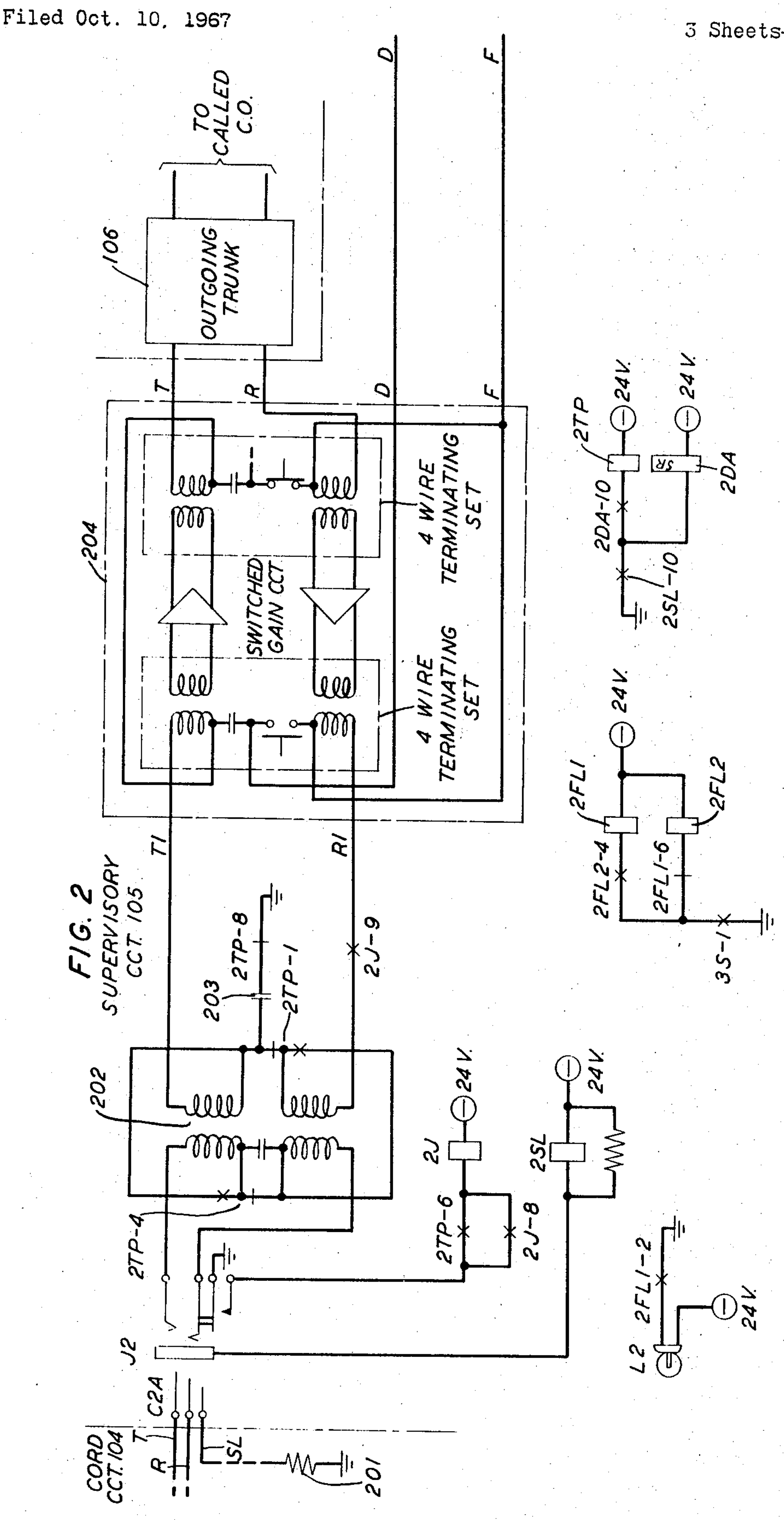
FIGS. 2 and 3 are schematic drawings showing in greater detail the interrelation and functioning of the components of the exemplary embodiment.
Figure 3:
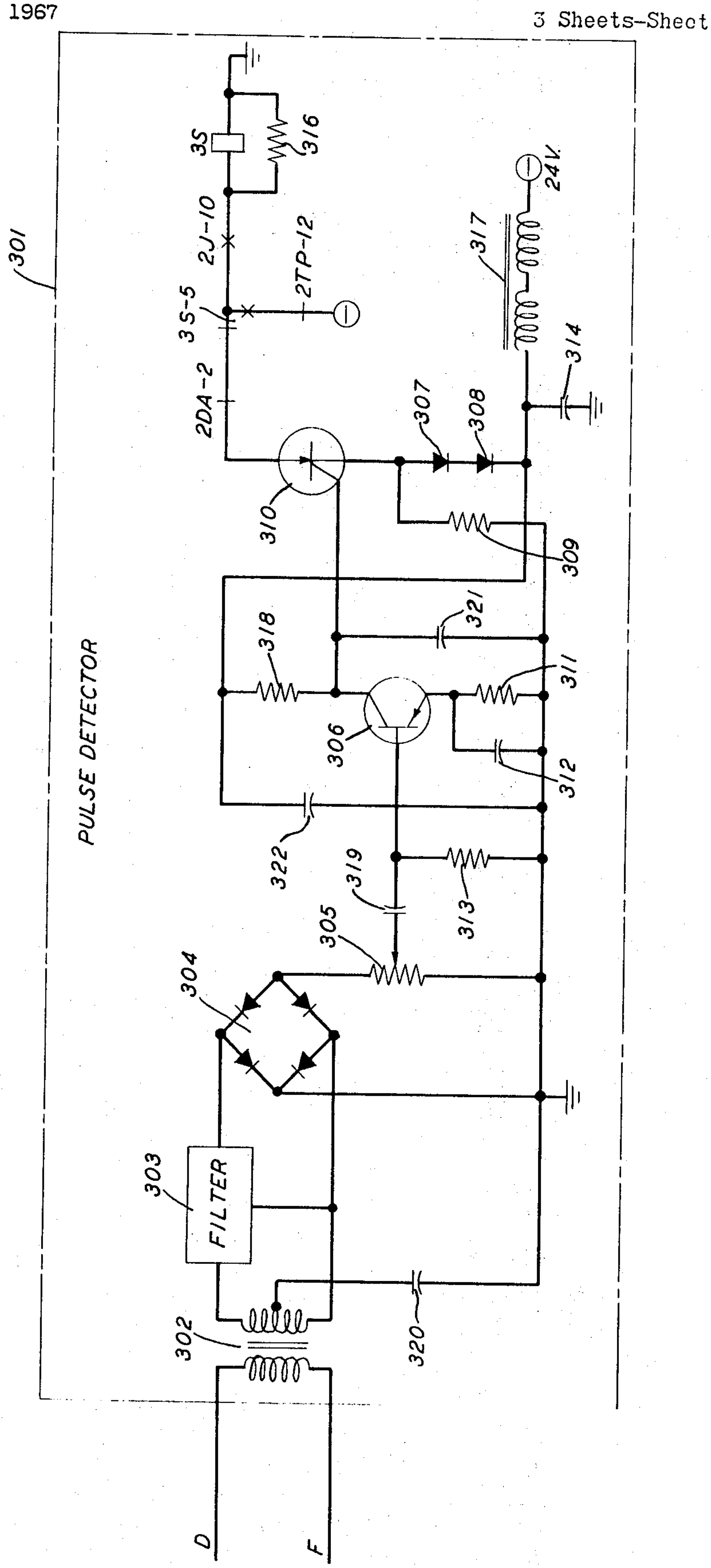

It will be noted that FIGS. 2 and 3 employ a type of notation referred to as "detached-contact" in which an "X," shown intersecting a conductor, represents a normally open contact of a relay, and a bar, shown intersecting a conductor at right angles, represents a normally open contact of a relay, and a bar, shown intersecting a conductor at right angles, represents a normally closed contact of a relay; "normally" referring to the unoperated condition of the relay. The principles of this type of notation are described in an article entitled "An Improved Detached-Contact-Type Schematic Circuit Drawing" by F. T. Meyer in the September 1955 publication of the American Institute of Electrical Engineers Transactions, Communications and Electronics, volume 74, pages 505–513.

The present invention is illustrated in a telephone answering service comprising a switchboard having a plurality of incoming and outgoing trunks associated therewith in addition to the conventional position cord circuits and the respectively associated trunk and station cords.

Figure 1:
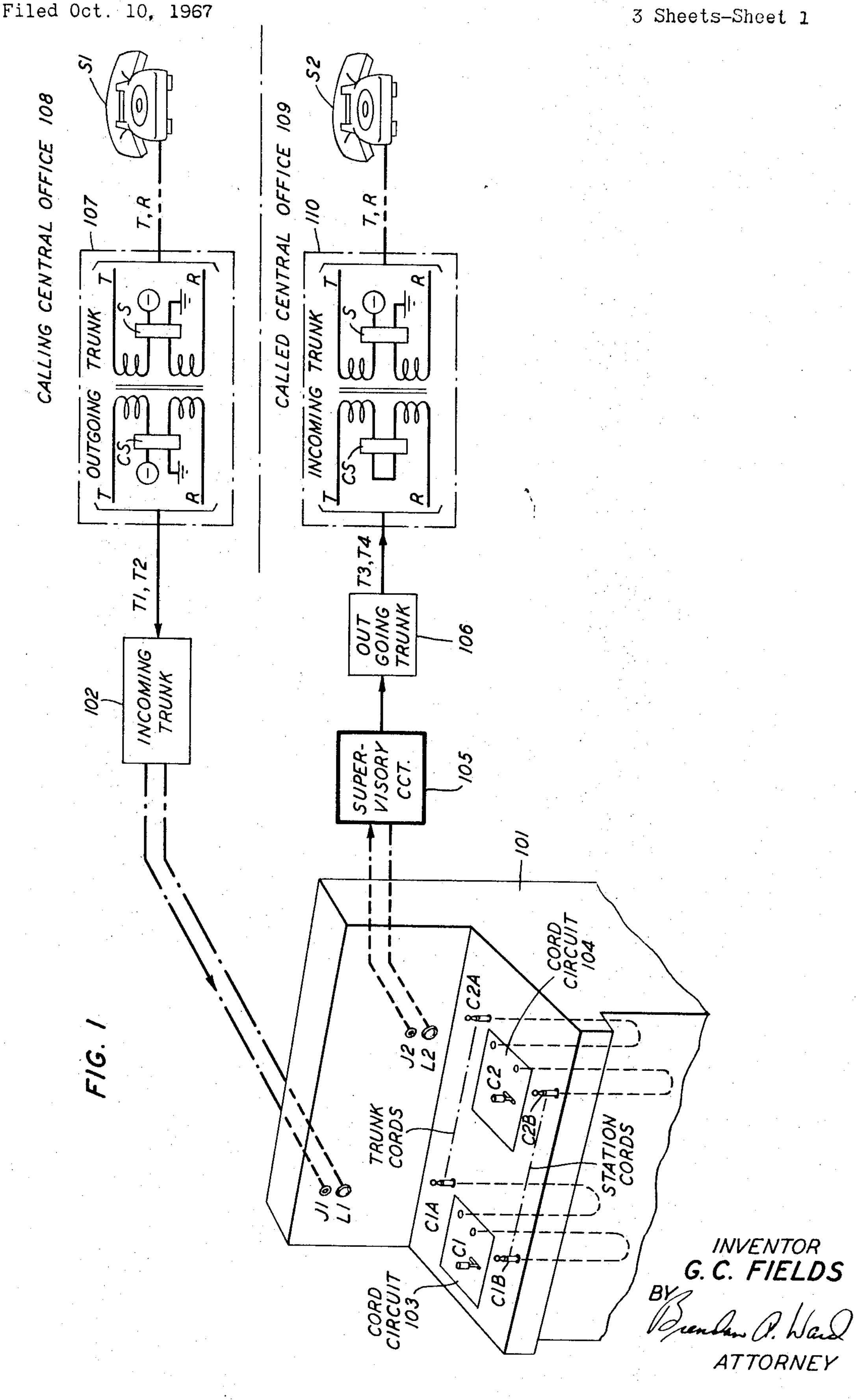
FIG. 1 is essentially a block diagram showing the interrelation of the components of the exemplary embodiment of the invention.

The invention described herein is particularly concerned with apparatus in supervisory circuit 105 which is represented by the block shown with heavy lines in FIG. 1 in order to distinguish it from prior art equipment units which are neither shown nor described in detail except where necessary for a complete understanding of the invention.

GENERAL DESCRIPTION

The interrelation and function of the equipment units of the exemplary embodiment will now be described with reference to FIG. 1 wherein the interconnection of circuit blocks has been designated by means of arrows to show the direction of circuit action.

FIG. 1 shows a switchboard 101 which for purposes of the illustrative embodiment is intended to represent one such position arranged to provide telephone answering service. It is, of course, obvious that although only one position is shown, numerous positions may, in fact, be employed and multipled in the well-known prior art manner.

Switchboard 101 comprises cord circuits 103 and 104, each of which is associated with the switchboard appearance of incoming trunk 102 and outgoing trunk 106, respectively. Each cord circuit contains a key (viz., keys C1 and C2), the well-known "talk and dial" keys which, when enabled, permit communication between the attendant and the calling or called station in addition to associating the operator position dialing equipment with a trunk so as to permit dialing of a called number. Each of the cord circuits also contains a trunk cord and a station cord. The purpose of the trunk cord, as is well known in the art, is to enable the attendant to communicate with a calling station (such as station S1) upon insertion of the trunk cord plug (such as C1A) into the appropriate jack. The station cord, on the other hand, is used to patch through a calling connection to a called station upon insertion of the station cord plug into the jack associated with the called station or into the jack associated with a trunk having access to a called station (such as outgoing trunk 106 which has access to station S2).

Incoming trunk 102 is shown as appearing on switchboard 101 via a jack designated J1 which provides the tip, ring and sleeve conductors of the communications path associated with the incoming trunk in the well-known manner. Lamp L1 at switchboard 101 is also shown associated with trunk 102 and is utilized to alert the attendant to the enabling of the trunk in response to an incoming call.

In similar fashion, outgoing trunk 106 has associated therewith jack J2 and lamp L2 at switchboard 101. In addition, as noted earlier, supervisory circuit 105 is associated with outgoing trunk 106 and for purposes of the illustrative embodiment is shown in FIG. 1 as being inserted serially between switchboard 101 and outgoing trunk 106.

We shall assume that an incoming call has been directed to a called station which has an appearance on switchboard 101 in order to provide that station with call answering service.

We shall further assume that the connection originates at station S1 in calling central office 108, and that it has been extended via the well-known T and R conductors from station S1 through an available outgoing trunk, such as trunk 107, and via cable conductors T1 and T2 to the aforesaid incoming switchboard trunk 102. Outgoing trunk 107 typifies any one of a number of conventional outgoing trunks well known in the art. However, this trunk has been shown in skeletonized form in FIG. 1 in order to more clearly highlight the application of my invention. In this regard it will be noted that outgoing trunk 107 comprises a repeat coil, the respective windings of which are associated with a relay provided for supervisory purposes and controlled by a D-C electrical path. The significance of the aforesaid conductive elements shown in outgoing trunk 107 with respect to my invention will be more apparent from that which is contained hereinafter. Thus, upon the enabling of outgoing trunk 107, incoming trunk 102 is also enabled in the well known manner and lamp L1 lights so as to alert the attendant to the existence of the incoming call. The attendant thereupon inserts trunk cord C1A into jack J1 in order to associate the switchboard position circuit (not shown) with the calling party. The attendant thereupon enables key C1 to the "talk and dial" position thereby completing a communications path in the well-known prior art manner between the attendant position circuit and the calling station via incoming trunk 102. We shall assume that the attendant concludes, after conversing with the calling party, that the nature of the call dictates its completion through to the subscriber having the benefit of the call answering service. We shall further assume that the attendant is aware of the called number at which the subscriber may be reached and determines that the appearance of trunk 106 at jack J2 of switchboard 101 shall be utilized for this purpose.

The attendant releases the previously enabled "talk and dial" key C1 and operates key C2 which is associated with jack J2. The attendant thereupon inserts cord C2A into jack J2 thereby seizing outgoing trunk 106. Upon receipt of dial tone, the attendant dials the desired number and then replaces cord C2A with cord C1B.

It will be obvious from the foregoing that the existing connection now comprises a continuous trunk-to-trunk path extending from the calling station via outgoing trunk 107, inoming trunk 102, jack J1 on switchboard 101, trunk cord C1A, cord circuit 103, station cord C1B jack J2 and via supervisory circuit 105, outgoing trunk 106, and incoming trunk 110 in called central office 109 to the called station.

Deviating momentarily, it will be noted that incoming trunk 110 is intended to be any one of a number of conventional incoming trunks well known in the art. In this regard it will also be noted that the apparatus shown within incoming trunk 110 comprises a number of inductive elements; namely, a repeat coil and a pair of supervisory relays. The significance of the aforesaid inductive elements in incoming trunk 110 will be more apparent from the subsequent description contained hereinafter.

Upon answer by the called party, the attendant releases the previously enabled "talk and dial" key C2 and proceeds to establish other connections in a similar manner as dictated by the circumstances presented in each instance.

Upon either station disconnecting, the opening of the associated subscriber loop causes a high amplitude pulse to be generated in the circuit because of the collapse of the magnetic fields in the repeat coils and relay windings, as earlier set forth, in either outgoing trunk 107 or incoming trunk 110 as determined by the particular station which initiates abandonment of the connection by returning to an on-hook condition. As will be more apparent from that which is contained hereinafter, supervisory circuit 105 detects and recognizes this pulse and causes the flashing of lamp L2 at switchboard 101 to inform the operator that one of the involved stations has disconnected and thus the trunk-to-trunk connection may be removed so as to render the equipment available for other connections in similar fashion.

DETAILED DESCRIPTION

With respect to the following detailed description we shall assume that the attendant at switchboard 101 has answered an incoming call via incoming trunk 102 as hereinbefore set forth. We shall further assume, as also hereinbefore set forth, that the attendant has selected outgoing trunk 106 by the insertion of the plug associated with cord C2A into jack J2.

Referring now to FIG. 2, ground is extended from cord circuit 104 via the SL conductor associated with plug C2A, through the sleeve connection of jack J2 so as to operate relay 2SL at this time by an obvious circuit. The operation of relay 2SL enables make contact 2SL–10 thereby operating relay 2DA. Enabled break contact 2DA–2 (see FIG. 3) maintains the pulse detector disabled, while the enabling of make contact 2DA–10 completes the obvious operate path of relay 2TP.

Relay 2TP enabled: (1) connects the simplex leads of transformer 202 together to provide a metallic connection to the central office for dialing; (2) operates relay 2J via the ground extended from enabled jack J2 through enabled make contact 2TP–6 to the winding of the 2J relay; (3) enabled make contact 2TP–12 opens the locking path of relay 3S; and (4) enabled break contact 2TP–8 disables capacitor 203 which is provided for longitudinal noise suppression. The enabling of relay 2J, as aforesaid, enables make contact 2J–9 thus completing the loop which now extends from cord circuit 104 at the switchboard position through outgoing trunk 106 to the called central office.

Digressing momentarily, switched gain amplifier circuit 204 is shown in block form in FIG. 2 in order to simplify the disclosure. It is to be noted, however, that this circuit may comprise any number of configurations well known in the art operable to provide gain dependent upon the direction of transmission with a fairly constant output level irrespective of the input level. In the instant arrangement it is intended that switched gain circuit 204 comprises a conventional back-to-back hybrid coil arrangement with gain introduced in the four-wire legs.

Proceeding now with the description, upon receiving dial tone from the called central office via outgoing trunk 106 in the well-known manner, the attendant dials the called directory number and replaces cord C2A with cord C1B as earlier set forth, in order to complete the trunk-to-trunk connection. The attendant maintains supervision of the established connection until the called party answers at which point the attendant releases the "talk and dial" key C2 as hereinbefore set forth.

In a manner well known in the art, the release of the "talk and dial" key causes an increase in the sleeve resistance present on the sleeve conductor of jack J2. Relay 2SL thereupon releases, thus releasing relays 2TP and 2DA. The release of transfer contacts 2TP–1 and 2TP–4 disconnects the simplex leads of transformer 202 and terminates incoming trunk 102 via the transformer 202 primary winding and outgoing trunk 106 via the transformer 202 secondary winding thereby isolating the battery and ground potentials of the respective central offices involved in the connection.

The release of break contact 2TP–8 reconnects capacitor 203 to the center tap of transformer 202. As will be more apparent from that which is contained hereinafter, capacitor 203 is effective to reduce longitudinal noise to the pulse detector (FIG. 3) and thereby prevent false triggering of this circuit.

It will be noted that relay 2DA is arranged as a slow-release relay. Thus, the opening of the operate path of relay 2DA is not effective to cause the release of the contacts associated with relay 2DA until such time as the previously operated contacts associated with relay 2TP have restored to normal. The subsequent release of break contact 2DA–2 prepares pulse detector 301 for enabling in a manner described hereinafter, after all switching transients caused by the release of relay 2TP have subsided.

We shall assume at this point that the conversation is terminated by an on-hook condition of either of the stations associated with the trunk-to-trunk connection. As described hereinbefore, the disconnection of either party, the opening of the subscriber loop causes a high amplitude pulse to be generated because of the collapsing magnetic fields in the repeat coils and relay windings serving the connection. The fundamental frequency of the pulse produced by such a disconnection lies within the range of approximately 200 to 300 Hz., while the peak amplitude reached by such a pulse is significantly greater than that produced by line noise or voice currents. The foregoing characteristics are constant irrespective of the length of the subscriber loop or the type of telephone central office involved.

When the disconnect pulse appears at the primary of transformer 302 via the D and F conductors from switched gain circuit 204, it is extended by the secondary of transformer 302 to filter 303. Filter 303 comprises any one of a number of configurations well known in the art operable to pass frequencies below 325 Hz. Thus the presence of filter 303 renders the detector insensitive to signals generated by voice currents or noise. The aforesaid signal is extended to a conventional diode bridge 304 at this time and thus the pulse appears at potentiometer 305 as a negative potential. It will be noted that this negative potential will appear at potentiometer 305 irrespective of the polarity of the potential which induced the pulse because of the action of diode bridge 304. The aforesaid potential is thus placed on the base of transistor 306 turning on the transistor and causing its collector to go positive in the well-known manner.

Diodes 307 and 308 and resistor 309 are provided to provide a bias on the gate of silicon controlled rectifier 310. However, the gate of silicon rectifier 310 is coupled to the collector of stage 306. Thus, when the collector exceeds the aforesaid bias, silicon controlled rectifier 310 is enabled.

As a result of the enabling of stage 310, battery is placed on the winding of relay 3S by an obvious circuit. Relay 3S thereupon locks operated through enabled make contacts 2J–10, enabled transfer contacts 3S–5 and released break contact 2TP–12 to negative battery. The operation of relay 3S enables make contact 3S–1 thereby completing the obvious operate path of relay 2FL2.

The enabling of make contact 2FL2–4 completes the obvious operate path of relay 2FL1, which, in turn, causes the release of relay 2FL2 via enabled break contact 2FL1–6. The operation and release of the aforesaid 2FL2 and 2FL1 relays continues in the aforesaid sequence thereby causing lamp L2 to be lighted and extinguished at a predetermined rate under control of make contact 2FL1–2. The attendant is thus informed of the disconnection of one of the stations involved in the trunk-to-trunk connection. Accordingly, the attendant removes the position cords associated with the call thereby releasing the associated equipment for use on subsequent calls of the same or similar nature.

While the exemplary embodiment has been disclosed in an arrangement whereby a supervisory signal detector employing the principles of my invention is connected to each outgoing trunk which forms a part of a trunk-to-trunk telephone connection extended through a telephone switchboard, it is to be recognized that numerous other arrangements may be made by those skilled in the art without departing from the spirit and scope of my invention.

For example, the supervisory signal detector may be arranged without direct connection to any trunk except as dictated by specific need, at which point it may be so associated by manual or automatic switching means.

Another example would be where the signal detector is employed in connection involving stations which are not telephone stations, but rather data sets, teletypewriters or any such stations employing communications paths similar to that used for telephone stations.

What is claimed is:

1. In combination, a communication circuit extending between two stations, means selectively controllable by each said station for opening said circuit, and means for detecting electrical signals generated by the opening of said circuit comprising:

a filter coupled to said circuit operable to pass said electrical signals only at frequencies less than a predetermined value, a bridge circuit connected to said filter and responsive to a signal passing through said filter for providing an output potential of predetermined polarity, detecting means connected to said bridge circuit and enabled by said output potential for detecting presence of said electrical signals, and indicating means enabled by said detecting means for indicating the opening of said circuit.

2. In a telephone system, an arrangement for advising an attendant of the termination of a communication over a patched connection comprising:

filter means connected to said connection and operable to pass electrical signals of the frequency of the electrical oscillation generated upon the collapse of the magnetic fields of inductive elements associated with opening the connection but not to pass signals higher than a predetermined frequency, a bridge circuit connected to said filter means and responsive to a signal passing through said filter means for providing an output potential of predetermined polarity, detecting means connected to said bridge circuit for detecting presence of said output potential, and indicating means enabled by said detecting means for advising the attendant of the opening of said connection.

3. In a telephone system, an arrangement in accordance with claim 2 wherein said filter means is operable to pass electrical signals of a frequency of less than 325 Hz.

4. In a telephone system, an arrangement in accordance with claim 2 further comprising capacitor means selectively connected to the connection for longitudinal noise suppression.

5. In a telephone system, an attendant position, incoming trunk means to said position, outgoing trunk means from said position, means at said position for patching a connection between said incoming and outgoing trunks, and a supervisory circuit connected to said outgoing trunk for detecting the release of either trunk by the calling or called party, said supervisory circuit including filter means coupled to said connection operable to pass electrical signals in the frequency range of the electrical oscillation caused by the collapse of magnetic fields of inductive elements released on the opening of the direct current circuits associated with either of the calling and called parties but not to pass signals of higher frequency, a bridge circuit connected to said filter means and responsive to signals of either polarity from said filter means for providing a predetermined polarity output potential, detecting means connected to said bridge circuit for detecting presence of said output potential, and indicating means enabled by said detecting means for advising the attendant of the release of said connection.

6. In a telephone system, an arrangement in accordance with claim 5 further comprising:

means for preventing operation of said indicating means during establishment of the patched connection by the attendant.

7. In a telephone system, a pair of telephone stations, an attendant position, a closed communication circuit, which comprises at least one inductive element, extending from each one of said stations to said position, a source of direct current potential impressed upon each said circuit, means at said position for interconnecting said communication circuits, switchhook means at each said station for opening each said circuit, and supervising signal detecting means at said position for detecting electrical signals generated by the opening of said circuit comprising:

a filter coupled to said circuits operable to pass said electrical signals only at frequencies less than 325 Hz., a bridge circuit connected to said filter and responsive to a signal passing through said filter for providing an output potential of predetermined polarity, a detector circuit connected to said bridge comprising a solid-state switch and a relay operable by said solid-state switch in response to said output potential, and means enabled by said relay for visually indicating the opening of either of said circuits.

References Cited

UNITED STATES PATENTS

| | | | |
|---|---|---|---|
| 3,397,288 | 8/1968 | Semon | 179—42 |
| 3,308,245 | 3/1967 | Levine | 179—27 |

WILLIAM C. COOPER, Primary Examiner

T. W. BROWN, Assistant Examiner

U.S. Cl. X.R.

179—27